Figure 1:
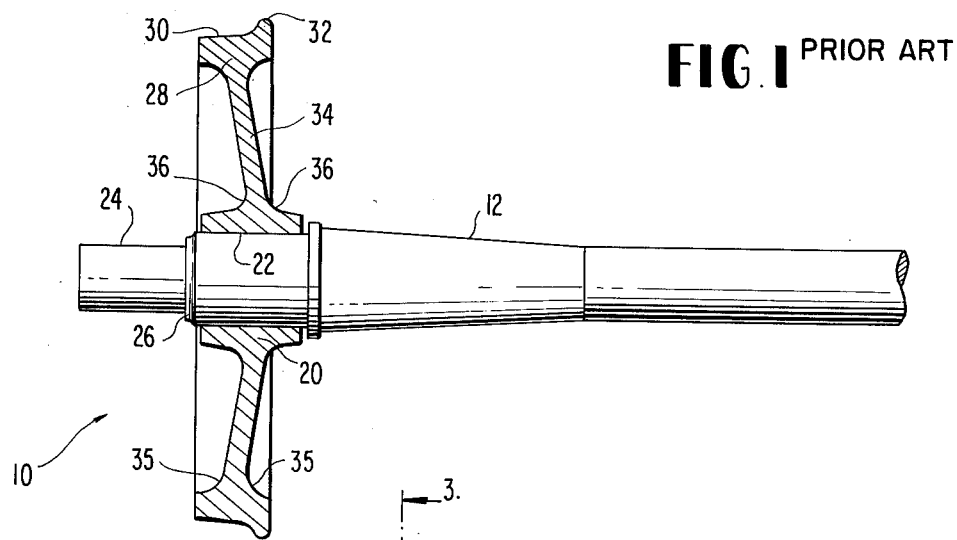

United States Patent [19]

Capps et al.

[11] 4,093,299
[45] June 6, 1978

[54] ARTICULATED RAILWAY SERVICE WHEEL AND UNITARY RAILWAY HUB AND AXLE

[75] Inventors: Overton B. Capps, Verona; J. Richard Milliken, Pittsburgh, both of Pa.

[73] Assignee: Edgewater Steel Company, Oakmont, Pa.

[21] Appl. No.: 728,115

[22] Filed: Sep. 30, 1976

[51] Int. Cl.² ............................................. B60B 17/00
[52] U.S. Cl. ........................................ 295/14; 152/85; 301/66; 301/80
[58] Field of Search .................. 295/7, 11, 14, 15, 21, 295/25, 36 R, 43; 152/76, 79, 80, 84, 85, 81-83, 86; 301/12 R, 12 M, 37 SS, 56, 58, 59, 60, 67, 70, 79, 80, 82, 83, 104

[56] References Cited

U.S. PATENT DOCUMENTS

| 181,854 | 9/1876 | LeMay | 295/14 |
| 288,469 | 11/1883 | Merrihew | 295/15 |
| 1,153,919 | 9/1915 | Hopkins | 301/60 X |
| 1,184,787 | 5/1916 | Spurnaw | 152/79 X |
| 1,262,372 | 4/1918 | Millen | 152/79 X |
| 1,461,408 | 7/1923 | Watts | 152/79 |
| 1,751,007 | 3/1930 | Kreissig | 295/15 |
| 1,837,302 | 12/1931 | Waite | 301/67 |
| 2,767,027 | 10/1956 | Horn | 301/37 SS |
| 3,024,626 | 3/1962 | Frischman | 295/36 R X |
| 3,915,490 | 10/1975 | Ranger et al. | 295/15 |

FOREIGN PATENT DOCUMENTS

| 1,090,144 | 10/1954 | France | 301/37 SS |
| 1,103,051 | 5/1955 | France | 295/7 |

*Primary Examiner*—Robert B. Reeves
*Assistant Examiner*—Fred A. Silverberg
*Attorney, Agent, or Firm*—Shanley, O'Neil and Baker

[57] ABSTRACT

Articulated railway service wheel with structurally distinct rim, web, and hub. A toroidal rim is interconnected to the hub by a rod-like web defining individual spring units which respond in tension and compression to vertical and lateral loading. The spring web units are seated in rim and hub socket means which prevent relative rotational movement. A unitary hub-axle is also provided.

17 Claims, 7 Drawing Figures

U.S. Patent  June 6, 1978  Sheet 1 of 3  4,093,299

U.S. Patent June 6, 1978 Sheet 2 of 3 4,093,299
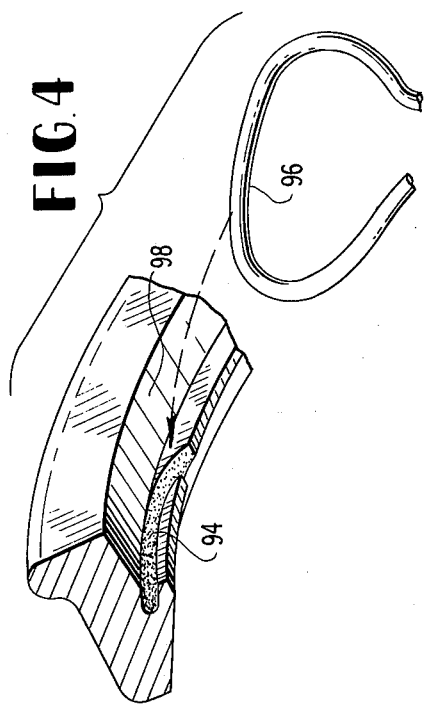
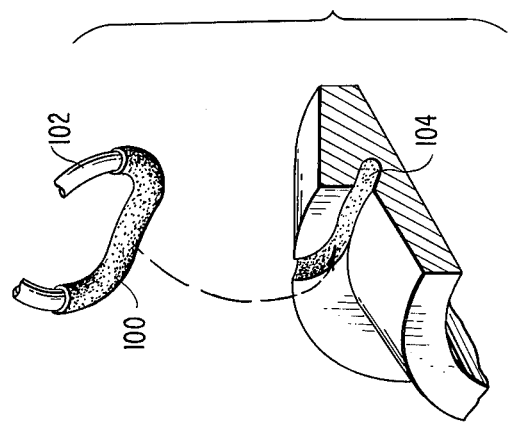
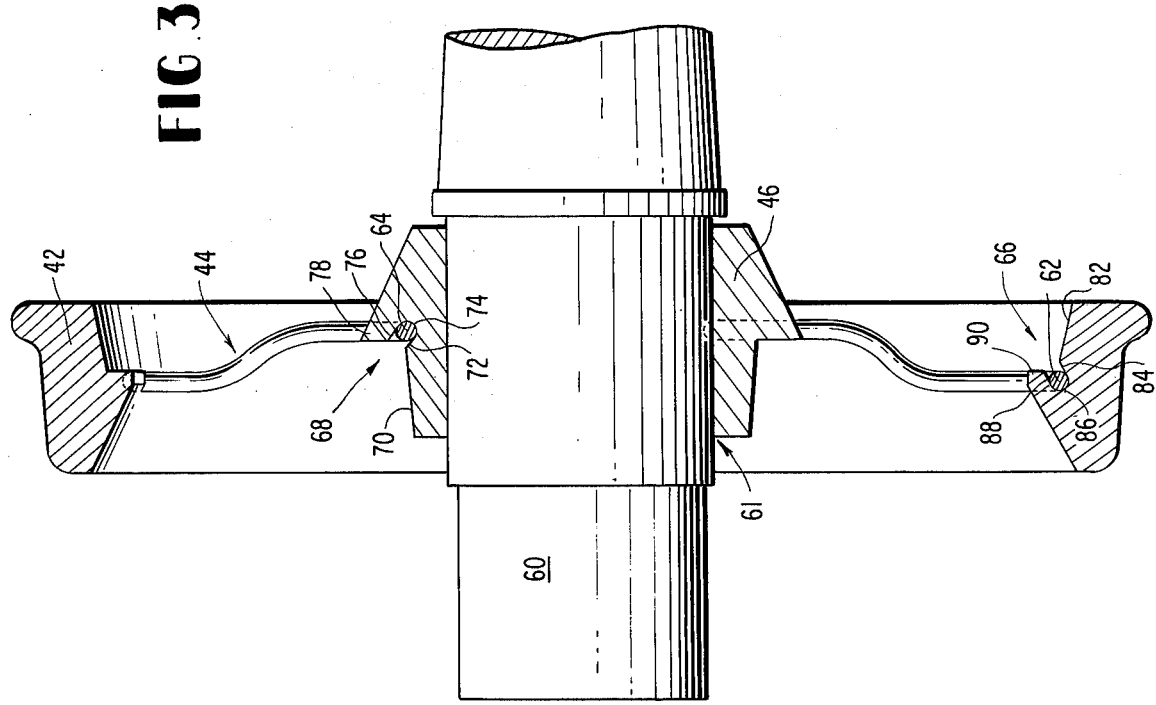

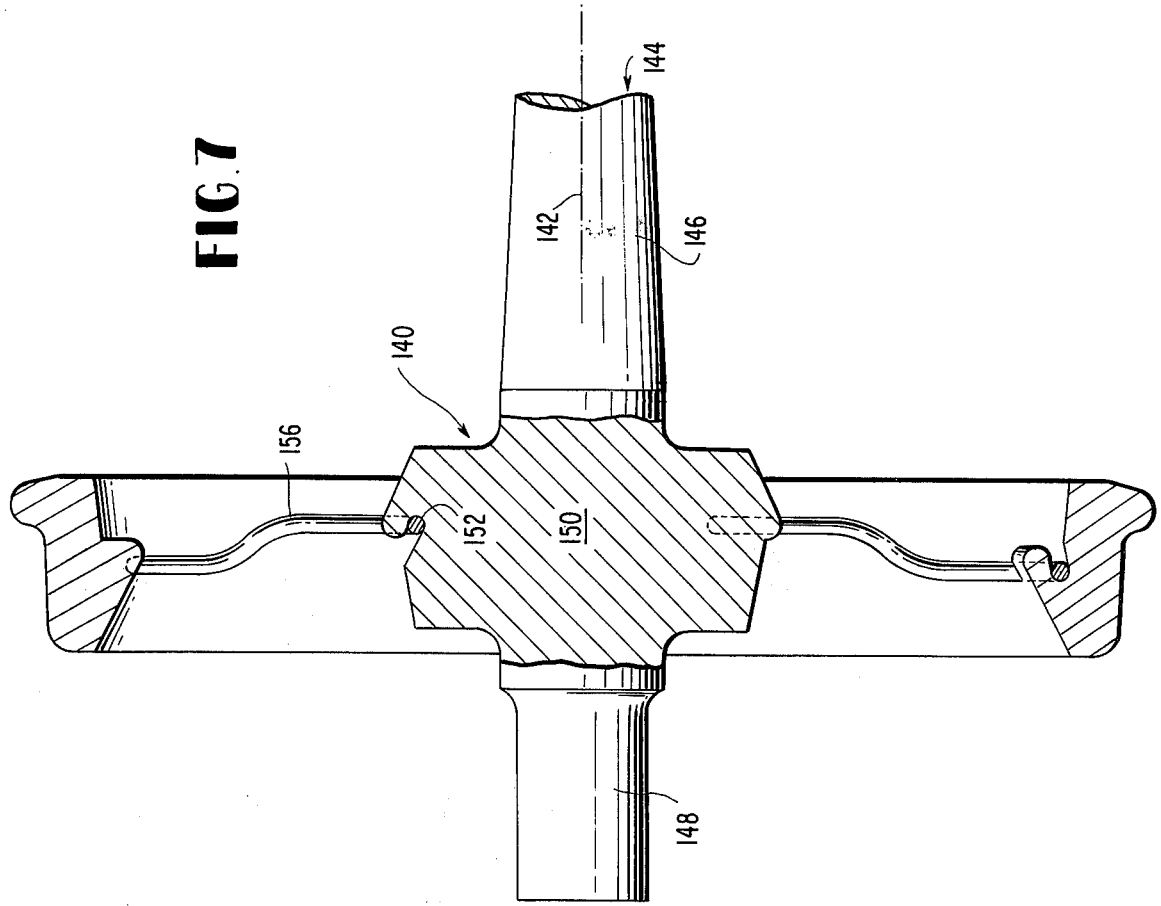
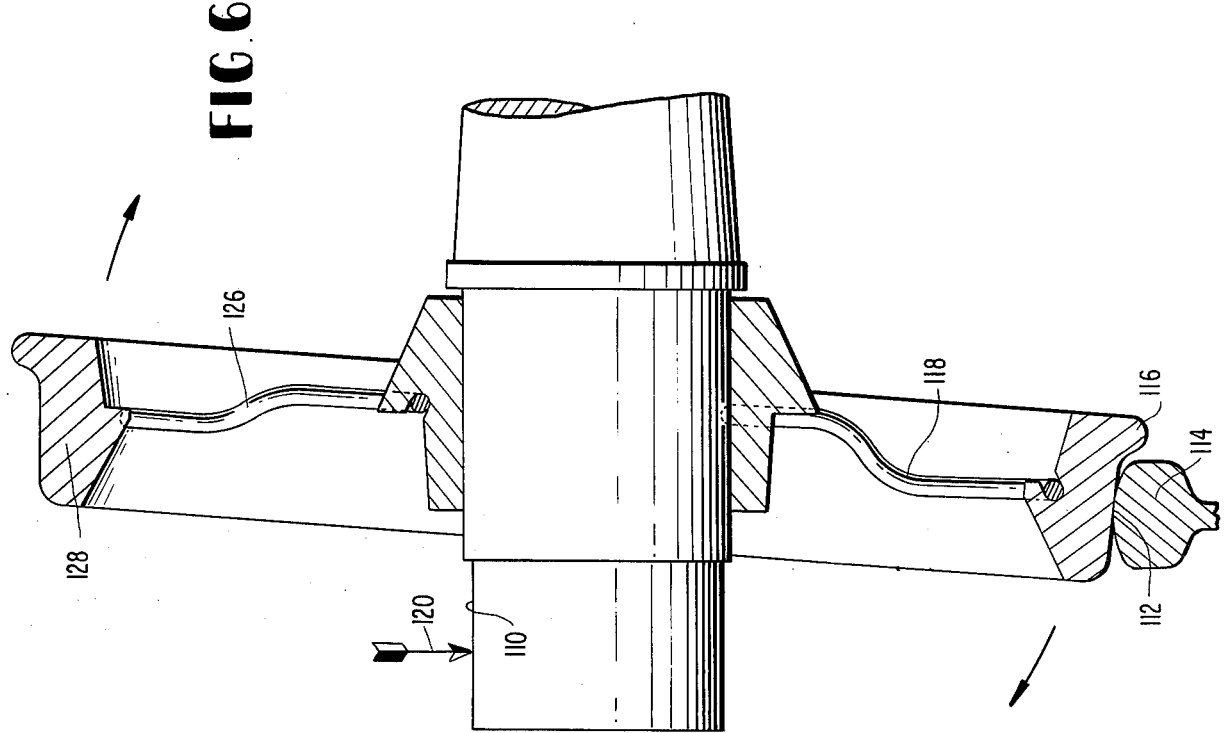

ARTICULATED RAILWAY SERVICE WHEEL AND UNITARY RAILWAY HUB AND AXLE

This invention relates to railway wheels and axles. In its more specific aspects, the invention is concerned with a railway service wheel having structurally distinct parts which may be assembled for use, separated for renovation, and assembled for reuse in service and, further, with a unitary hub and axle for use with structurally distinct web and rim structures of an articulated railway service wheel.

Commercial practice has established the unitary-structure steel wheel in railway service. In this structure a solid plate web extends between the hub and rim of the wheel. Such wheels are formed a single piece of wrought or cast steel. Manufacturing steps for unitary-structure wrought and cast steel wheels are established and well known in the art; see, e.g. The Association of American Railroads, "Wheel and Axle Manual," 11th Ed., 11/1/75, pp. 148–154.

While such wheels are eminently successful and practical for numerous reasons, their unitary structure limits selection of materials. This requires compromises since differing parts of the wheel serve differing functions. Such unitary structure also contributes to the worn flanges, loose wheels, plate cracks, and thermal and mechanical damage to the rim and other parts of the wheel which occur in railway service.

By contrast, the multi-part wheel and articulation concepts of the present invention help alleviate such shortcomings and contribute advantages in use, repair and manufacture of railway service wheels and axles not available with the unitary wheel structure of the prior art.

More specific advantages and contributions of the invention will be evident from a comparison of conventional unitary steel wheels with features of the articulated wheel of the present invention and its assembly which are described in more detail in relation to the accompanying drawings.

Figure 2:
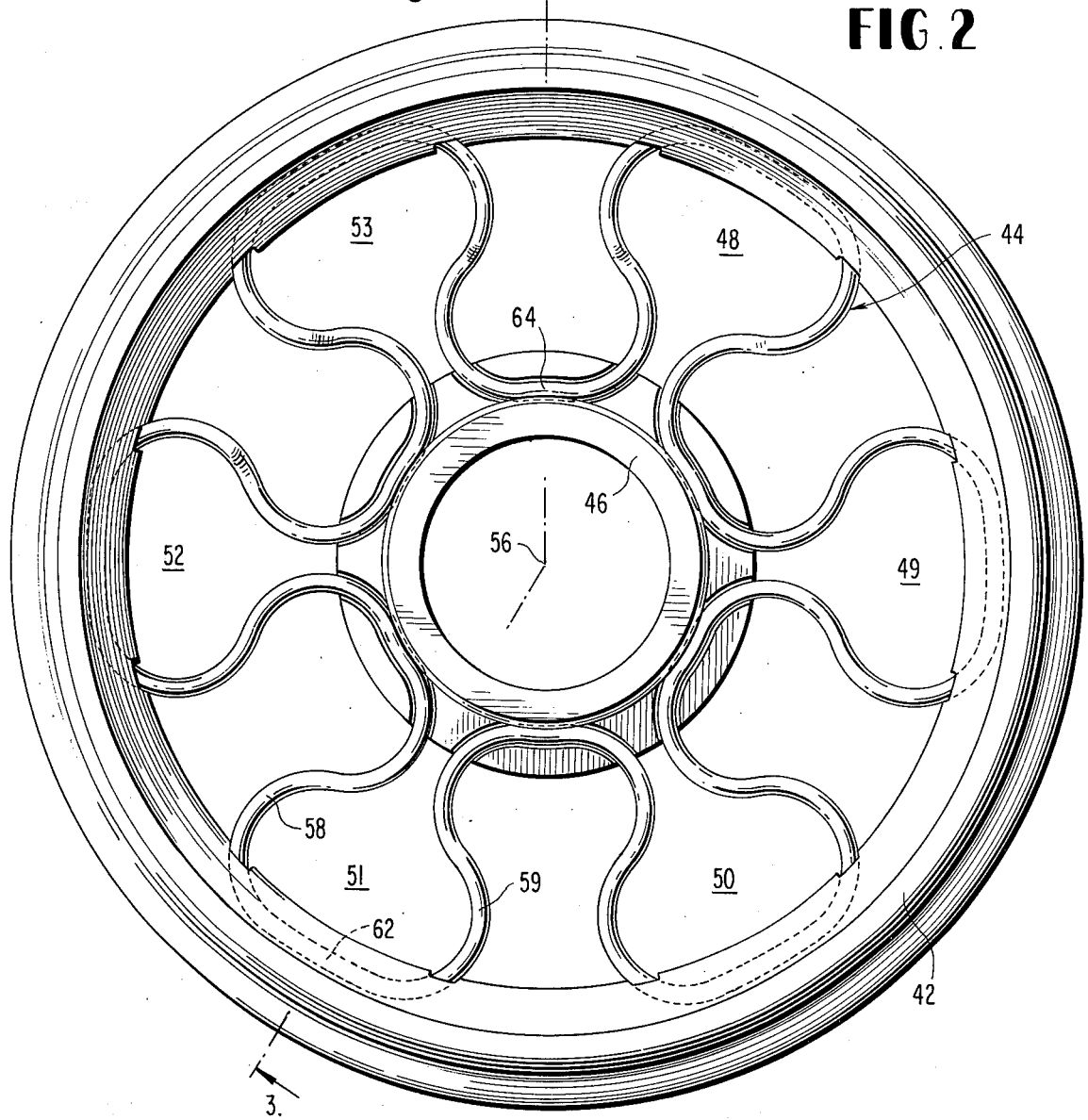

In the drawings:

FIG. 1 is a diametral cross-sectional view of the prior art steel wheel mounted on a railway axle, FIG. 2 shows schematically an axially-directed plan view of the articulated railway wheel of the present invention with portions shown in dotted lines, FIG. 3 is a cross-sectional view of the articulated railway wheel of the present invention with hub means mounted on a railway axle, taken along line 3—3 of FIG. 2, FIG. 4 is a perspective view of a cutaway rim portion of the articulated railway wheel of FIG. 2, FIG. 5 is a perspective view of a cutaway hub portion of the articulated wheel of FIG. 2, FIG. 6 is a schematic cross-sectional view (similar to FIG. 3) of an articulated wheel of the present invention for illustrating vertical and lateral forces encountered by an articulated wheel and limited relative movement between its parts, and FIG. 7 is a longitudinal view (similar to FIG. 3), partially in cross-section, of the unitary railway axle and hub means of the present invention.

Prior art wheel 10 of FIG. 1 is unitary in structure and is mounted to be integral with railway axle 12. Hub 20 is press fitted onto wheel seat 22 so as to turn with car axle 12. As is known, axle 12 is joined to a railway car through a bearing. Such bearing rides on journal 24 which is part of the axle and, as here shown, is located outboard of dust guard seat 26.

Rim structure 28, of unitary wheel 10, includes tread 30 and flange 32. Hub 20 and rim 28 are interconnected by solid plate web 34 with rim fillet 35 and hub fillet 36 configurations substantially as shown. The rim 28 is conventionally offset laterally with respect to the hub 20. The resultant "dished" configuration is accomplished in the final steps during manufacture of a wrought steel wheel; additional details of conventional wheel and axle structure and manufacture can be found in the above referenced AAR "Wheel and Axle Manual," in particular at p. 7 and pp. 152–154.

Many of the inherent characteristics and shortcomings of the prior art steel wheel result from its unitary and substantially rigid construction which lacks any substantial degree of flexibility. For example, service life of wheels and related car structures are adversely affected by the severe impact resulting from track irregularities and "wheelset hunting" forces which are not cushioned because of the rigidity of the solid-web unitary structure wheel in general commercial use.

Also, the heat generated in cyclic braking (on the rim tread) which cannot be dissipated rapidly enough can contribute to cracking of the solid plate between the rim and hub while localized rim heating contributes to cracking and spalling of the rim tread. While a material better suited to rim braking may be available for rim manufacture, such material may not be optimum for other parts of the unitary wheel structure.

Additionally, when a prior art solid wheel must be removed for any purpose, the axle bearing must also be removed to enable movement of the hub from the axle. Remounting of a wheel involves re-machining costs and a new risk of a loose wheel developing.

The invention contributes to overcoming these and other shortcomings of the prior art steel wheel in providing for improved dissipation of heat generated in braking, providing for selection of differing materials for differing parts of the wheel, providing for improved lateral and vertical force absorption within the wheel itself, providing for circumferential expansion and contraction, providing sound damping within the wheel, providing weight reduction of the wheel itself, and providing for replacement or repair of rim structure or spring web without disturbing the hub means and, therefore, without disturbing the axle bearing.

These contributions are brought about through an articulation of structurally distinct parts of a wheel, namely rim structure, hub means, and interconnecting web. The structurally distinct rim structure is ruggedly interconnected to the hub means so as to withstand heavy rail freight service while at the same time providing for cushioning the vertical and lateral forces encountered in such service so as to minimize possible damage to wheel and car structure or lading. These unusual advantages are provided for through spring web means which absorb vertical forces due to loading and lateral forces due to rail conditions and turns, allowing, within the structure of the wheel itself, for limited and cushioned lateral deflection of the rim means.

In addition, the unique structures and articulation taught by the invention provide for selection of rim, hub, or spring web material and for replacement or repair of a rim or spring web without need for disturbing the relationship of the hub and axle.

Articulated wheel 40 of FIG. 2 includes rim means 42 circumferentially disposed about intermediate open web means 44 and centrally located hub means 46.

Web means 44 comprises elongated rod-like spring means, as shown, with the remaining area between the rim and hub being open. The rim means 42 and hub means 46 are removably interconnected by such open web means 44.

The elongated rod-like spring of open web means 44 presents a plurality of symmetrically disposed spring units 48, 49, 50, 51, 52, and 53 which can act individually in service. These spring units can be structurally distinct springs which meet and are held at rim 42 or hub 46 or, preferably, can be part of a single elongated rod-like unitary structure.

Each such spring unit has a generally U-shaped configuration as projected onto a plane perpendicular to the axis of rotation 56. Each spring unit includes a pair of legs, e.g. 58, 59 of spring unit 51, extending between the rim means and the hub means with the resultant component of direction of each leg, in so extending, being radial. However, it should be noted that the leg means have a curvilinear configuration portion when projected onto a plane perpendicular to the axis of rotation. Such curvilinear configuration plays an important role in exerting tension and compression forces in absorbing the vertical and lateral forces encountered in railway service.

FIG. 3 shows, in diametral view, an articulated wheel of the present invention mounted on axle 60. Rim means 42 is interconnected by open web spring means 44 with hub means 46. The open web spring means 44 provide a "dished" or "coned" configuration in diametral cross section and can be curvilinear as shown, or rectilinear while still providing such "coned" configuration. Hub means 46 is made integral with axle 60 at wheel seat 61.

The radially extending legs comprise the sides of the generally U-shaped spring units with the U-shape being completed by a juncture segment interconnecting the radially extending legs. Such juncture segments interconnect the spring units at the rim and hub. For example, the radially extending legs of a spring unit are connected to the rim means 42 by rim juncture segment 62. Hub juncture segment 64 connects the spring unit legs to hub means 46. These juncture segments, essentially the connecting portion between the legs of a U-shaped configuration, are preferably of a curvilinear configuration especially where joined to the leg means.

These juncture segments of the spring units are shown seated within rim and hub socket means in FIGS. 2 and 3. The configuration of such socket means defines an entry portion, a seat portion, and a holding portion which provide the rugged interconnection required for railway usage while providing for articulation of the rim means, spring web means, and hub means. The sockets are unitary in structure with their respective rim or hub and are free of any fastener means nonunitary with said rim means and said hub means.

As shown in FIG. 3, rim juncture segment 62 fits into socket 66 and hub juncture segment 64 fits into hub socket means 68. Similar sockets means distributed about the wheel, as shown in FIG. 2, secure the spring units to allow for cushioning loads and impacts under tension and compression. The socket means prevent relative rotational movement between the elements yet allow for other limited relative movement of the parts under vertical and lateral loads.

The socket means also facilitate assembly of the articulated wheel and allow for separation of the rim for repair or replacement. For assembly purposes, hub means 46 includes an approach surface 70 (FIG. 3) leading to socket means 68. Such socket means 68 are defined in cross section by an entry sidewall 72, seat 74 and sidewall 76; the latter is formed, in part, by a radially directed holding lip means 78.

To assure holding of the spring web means securely in the socket means to withstand lateral and vertical forces, the angle of the approach surface 70 can be steepened and the length of lip 78 can be extended as required dependent on the loads and service to be encountered.

The assembly approach to rim socket means 66 is from the opposite side of the wheel. Rim means 42 includes an inclined approach surface 82 leading to rim socket means 66 which includes entry sidewall 84, seat 86 and sidewall 88 defined, in part, by a radially inwardly disposed holding lip means 90. As with the hub socket means, the lip means can be extended in length and/or the approach surface can be steepened to meet requirements of the loads, service, and assembly encountered with various design and various size wheels.

Juncture segments for the legs of the U-shaped spring units fit into socket means in the hub and rim as shown in FIGS. 2 and 3. The configuration of a socket means conforms to that of a juncture segment so as to prevent relative rotational movement and facilitate assembly.

The partially cutaway perspective view of FIG. 4 includes a radial cross section through the mid-point of rim socket 94. A rim juncture segment, such as 96, for a spring unit is slidable along approach surface 98 and fits into socket 94. The configuration of the rim juncture means and rim socket means are conforming to provide a snug complimentary fit between the parts.

The conforming configurations permit only limited non-rotational movement of the parts. E.g. the rim can be deflected out of the normal vertical plane under lateral and/or vertical loading; such deflective movement is controlled and limited by tension and compression forces exerted by the spring units.

Providing for such limited relative movement, in itself, considerably reduces noise over that generated by conventional unitary steel wheels in making turns, encountering track defects, and in wheel-set hunting. Additional sound damping can be obtained by lining the socket means with sound damping means, e.g. metal alloy materials such as Incramute I, an alloy of copper, manganese and aluminum described in the Incra Project report of July 1973 by the Olin Metals Research Labs, 91 Shelton Avenue, New Haven, Connecticut, published by International Copper Research Association, Inc., 825 Third Avenue, New York, New York 10022.

In one embodiment, such sound damping materials fit into the socket means. The sound damping material can take the form of a sleeve, such as sleeve 100 mounted on the hub juncture segment of spring unit 102 of FIG. 5. The sleeve and juncture segment conform to hub socket 104. Sound damping means can be used with the rim and/or the hub means.

The forces encountered in vertical and lateral loading are considered in relation to FIG. 6. Vertical loading, e.g., from the weight of a railway vehicle and lading, is applied at journal 110, with an equal and opposite reaction being exerted at lower rim portion 112 where supported on track 114. Lateral loading is exerted through the tread surface at the lower rim portion 112 and/or through flange 116.

The vertical loading applied through axle 110, as indicated by arrow 120, tends to shorten or compress lower leg 118 of the spring unit at the bottom of the wheel. The effect of a lateral load on the lower portion of rim 112 can be a force which tends to elongate the lower leg 118.

At the upper spring unit, leg 126 is subjected, by vertical loading of axle 110, to a force which tends to elongate that spring leg. The effect of lateral loading applied through the tread surface at the lower rim portion 112 and/or through flange 116 can be a force on the upper rim portion 128, which tends to shorten or compress upper leg 126.

The limited relative movement permitted by the spring units under vertical loading is shown in FIG. 6 with the tilted movement of the rim means being exaggerated over actual experience in order to illustrate the concept. In effect, vertical loading tends to shift lower rim portion 112 slightly outboard and the upper rim portion 128 is shifted slightly inboard by vertical loading. The configuration of the socket means and juncture segments of the spring units permits this slight toeout at the bottom of the rim in response to vertical loads. Lateral loads tend to offset this toe-out effect of vertical loads.

The spring units themselves are adapted to respond to the forces of lateral and vertical loading. Relative movement is resisted and limited by the tension and compression properties of the spring units; the degree of response being selectable by selecting characteristics, size, and configurational aspects of the spring material. The spring units distributed between the lower and upper spring units respond at levels intermediate to those described in relation to FIG. 6.

An advantage of the articulated wheel of the present invention over the conventional unitary steel wheel is the selectivity of materials for individual elements of the wheel. The rim material can be selected, or treated as an individual entity, to provide the desired braking and wear characteristics. The web means can be selected for desired spring properties and the hub means, if separate from the axle, can be selected for the desired strength characteristics.

Typically the rim means would be made from steel such as AISI #1050-1070 steels which contain about 0.50 to 0.75% carbon; using the Association of American Railroad (AAR) designation, typical steels would be AAR M107, Class U-A, B, C, or L.

The hub means would typically be non-brittle, heat treatable high strength steel of slightly lower carbon content than the conventional steel wheel, e.g. AISI #1045.

The elongated rod-like material of the web would typically comprise spring steel, e.g. AISI #5160. For ease of manufacture such elongated rod would typically have a substantially uniform circular cross-sectional configuration. However the cross-sectional configuration can vary in size at selected locations along its length to provide added strength or differing tension and compression characteristics as desired.

As shown, the spring web units have a curvilinear configuration in both plan and radial view which facilitates handling both vertical and lateral loads. However, satisfactory performance is available with spring web units which are curvilinear in plan view only and such units would be more economical to manufacture.

Unitary hub and axle 140 of the present invention is shown in partial cross-sectional view in FIG. 7. This structure is symmetrical about central longitudinal axis 142 and includes axle 144 having inboard portion 146 and outboard portion 148. Hub 150, intermediate the inboard portion 146 and outboard portion 148 is unitary with axle 144.

Unitary hub and axle 140 is formed from a single piece of metal. Hub 150 defines sockets such as 152, distributed about its periphery for reception of spring web legs such as 156. Such socket means are formed in hub 150 during manufacture of the unitary hub and axle 140, e.g., by machining. Socket means such as 152 include entry portions, seat portions, and holding lip portions as described earlier in relation to the non-unitary hub 46 of FIG. 3.

Advantages of the unitary hub and axle include elimination of loose hub problems, reduction of part replacement or repair costs, elimination of hub mounting costs, and possible manufacturing economies.

A typical steel for the unitary hub and axle is AAR M101.

In addition to the advantages of the invention in replacement of parts and selection of materials described above, there are other advantages and economies in use of the invention. For example, the calculated weight for the standard unitary AAR H-36 single wear railway wheel is seven hundred and twenty-five (725) pounds. Calculated wheel weight for a single wear 36 inch wheel of the invention is 539 pounds. Considering that eight wheels are used on a single freight car and, the number of cars that can be pulled together in a train, the weight savings, and therefore added freight which can be carried, constitute a significant advantage of the present invention.

Various configurations and materials have been set forth in describing the articulated wheel and unitary hub-axle of the present invention. In the light of such disclosure, other configurational and material selections will be available to those skilled in the art without departing from the basic inventive concepts set forth. Therefore, the scope of the present invention is to be determined from the appended claims.

We claim:

1. Structure for assembly of an articulated railway service wheel comprising
   rim means of toroidal configuration,
   hub means, and
   open web spring means for removably interconnecting the rim means to the hub means,
   the rim means in an assembled wheel being rotatable with and circumferentially disposed with relation to the hub means with open spaces being defined by the spring web means between the rim means and hub means in an assembled wheel,
   the open web spring means comprising elongated rodlike means defining a plurality of spring units which are distributed symmetrically between the rim means and hub means when in an assembled wheel,
   receiving means on the rim means and hub means for receiving and seating the spring units during assembly of a wheel,
   said receiving means being free of fastener means which are non-unitary with said rim means and said hub means, respectively while providing for removably interconnecting the rim means, spring web means, and hub means so as to permit predetermined relative movement between said structures, said predetermined relative movement being limited during assembled usage to movement permitted by tensioning and compressing of the spring units, each said spring unit having a generally U-shaped configuration when projected onto a plane in perpendicular relationship to the axis of rotation of an assembled wheel, each said generally U-shaped configuration spring unit comprising a pair of elongated legs extending between the rim means and the hub means establishing a resultant directional component for each said leg which is radial of an assembled wheel, said leg means presenting a curvilinear configuration when projected onto a plane in perpendicular relationship to the axis of rotation of an assembled wheel, said curvilinear configuration of the leg means changing in response to vertical and lateral forces applied through the hub means and rim means in an assembled wheel when in use.

2. The structure of claim 1 wherein said hub means presents centrally located bore means enabling the hub means to be fitted onto a railway vehicle axle for rotation with said axles when the articulated wheel is in railway service.

3. The structure of claim 1 in which the hub means is unitary with a railway vehicle axle.

4. An articulated railway service wheel comprising structurally distinct rim means, spring web means, and hub means, the rim means being of toroidal configuration, the spring web means removably interconnecting the rim means to the hub means, the rim means being circumferentially disposed with relation to the hub means with open spaces being defined by the spring web means between the rim means and the hub means, said articulated wheel being rotatable with a railway vehicle axle when mounted for railway service, the spring web means comprising elongated rod-like means defining a plurality of spring units distributed symmetrically about the assembled wheel between the rim means and the hub means, receiving means on the rim means and hub means for receiving and seating the spring units, said receiving means being free of fastener means which are non-unitary with said rim means and said hub means, respectively while removably interconnecting the rim means, spring web means, and hub means, so as to permit relative movement therebetween, said predetermined relative movement being limited during assembled usage to movement permitted by tensioning and compressing of the spring web means, each said spring unit having a generally U-shaped configuration when projected onto a plane in perpendicular relationship to the axis of rotation of the wheel, each said generally U-shaped configuration spring unit comprising a pair of elongated legs extending between the rim means and the hub means establishing a resultant directional component for each said leg which is radial of the wheel, said leg means in extending between the rim means and the hub means presenting a curvilinear configuration when projected onto a plane in perpendicular relationship to the axis of rotation of the wheel, said curvilinear configuration of the leg means responding to vertical and lateral forces applied through the hub means and rim means resulting in tensioning and compressing of the spring web means during railway vehicle service.

5. The articulated railway service wheel of claim 4 in which the hub means presents centrally located bore means enabling the hub means to be fitted onto a railway vehicle axle for rotation with said axle when the articulated wheel is in railway service.

6. The articulated railway service wheel of claim 4 in which the hub means is unitary with a railway vehicle axle.

7. The articulated railway service wheel of claim 4 in which the elongated legs of the spring units are joined by juncture segment means.

8. The articulated railway service wheel of claim 7 in which the socket means include sound damping means.

9. The articulated railway service wheel of claim 7 in which the receiving means comprise socket means into which said juncture segment means are inserted for assembly of the articulated railway service wheel.

10. The articulated railway service wheel of claim 9 in which the socket means define recessed seat means having an interior configuration which is complimentary to that of the juncture segment means.

11. The articulated railway service wheel of claim 9 in which the socket means have a cross-sectional configuration, in a radial plane, presenting an entry portion, a seat portion, and a holding lip portion.

12. The articulated railway service wheel of claim 11 in which the entry portion of the socket means define a surface which when measured in a radial plane is in angled relationship to the axis of rotation of the wheel.

13. The articulated railway service wheel of claim 9 in which the socket means have a curvilinear configuration in a plane perpendicular to the axis of rotation of the wheel, said curvilinear configuration of the socket means conforming to the configuration of the U-shaped spring units at their juncture segments.

14. The articulated railway service wheel of claim 4 in which the spring web means comprises an elongated continuous rod spring of circular cross section.

15. The articulated railway service wheel of claim 4 in which the elongated rod-like means present a substantially uniform cross-sectional configuration.

16. The articulated railway service wheel of claim 4 in which the receiving means on the hub means is in laterally off-set relationship along the axle of the wheel to the receiving means on the rim means to present a dished configuration.

17. The articulated railway service wheel of claim 16 in which the elongated legs of the spring units present a curvilinear configuration when projected onto a radial plane extending between the hub means and the rib means.

* * * * *